(12) United States Patent
Stegmüller

(10) Patent No.: US 6,975,780 B2
(45) Date of Patent: Dec. 13, 2005

(54) ELECTRO-OPTICAL COMPONENT

(75) Inventor: Bernhard Stegmüller, Augsburg (DE)

(73) Assignee: Infineon Technologies AG, München (DE)

( * ) Notice: Subject to any disclaimer, the term of this patent is extended or adjusted under 35 U.S.C. 154(b) by 40 days.

(21) Appl. No.: 10/764,021

(22) Filed: Jan. 23, 2004

(65) Prior Publication Data

US 2004/0184693 A1 Sep. 23, 2004

(30) Foreign Application Priority Data

Jan. 24, 2003 (DE) ................................ 103 03 676

(51) Int. Cl.[7] .............................................. G02F 1/035
(52) U.S. Cl. ......................................... 385/2; 359/245
(58) Field of Search ........ 385/1–147; 398/1–214; 343/700–900; 333/100–137; 359/1–35, 196–325

(56) References Cited

U.S. PATENT DOCUMENTS

| | | | |
|---|---|---|---|
| 5,402,259 A * | 3/1995 | Lembo et al. ............... | 359/245 |
| 5,479,539 A * | 12/1995 | Goldsmith et al. ........... | 385/14 |
| 5,917,636 A * | 6/1999 | Wake et al. ................ | 398/182 |
| 6,731,880 B2 * | 5/2004 | Westbrook et al. .......... | 398/115 |

OTHER PUBLICATIONS

Uehara, Kazuhiro et al. Lens-Coupled Imaging Arrays for the Millimeter and Submillimeter-Wave Regions. May 1992. Transactions on Microwave Theory and Techniques, vol. 40, No. 5. pp. 806-810.*

Ramdane, A. et al. Monolithic Integration of Multiple-Quantum-Well Lasers and Modulators for High-Speed Transmission. Jun. 1996. Journal of Selected Topics in Quantum Electronics. vol. 2, No. 2. pp. 326-335.*

Westbrook, L.D. et al. Simultaneous,bi-directional Analogue Fibre-optic Transmission Using an Electroabsorption Modulator. Sep. 12, 1996. Electronic Letters. vol. 32, No. 19, pp. 1809-1810.*

Yngvesson, K. Sigfrid et al. The Tapered Slot Antenna- A new Integrated Element for Millimeter-Wave Applications. Feb. 2, 2989. Transactions on Microwave Theory and Techniques. vol. 37, No. 2. pp. 365-374.*

Monolithically Integrated Yagi-Uda Antenna for Photonic Emitter Operating at 120 GHz, A. Hirata, T. Furuta and T. Nagatasuma, Electronics Letters, Aug. 30, 2001, vol. 37, Nr. 18, 2 pgs.

* cited by examiner

*Primary Examiner*—John D. Lee
*Assistant Examiner*—Rhonda S. Peace
(74) *Attorney, Agent, or Firm*—Eschweiler & Associates, LLC

(57) ABSTRACT

The invention relates to an electro-optical component with a millimeter or submillimeter antenna and an optical receiver. In order, in the case of such an electro-optical component, to achieve the situation in which millimeter waves or submillimeter waves can be generated particularly well, the invention provides for the optical receiver to be an electroabsorption modulator.

7 Claims, 3 Drawing Sheets

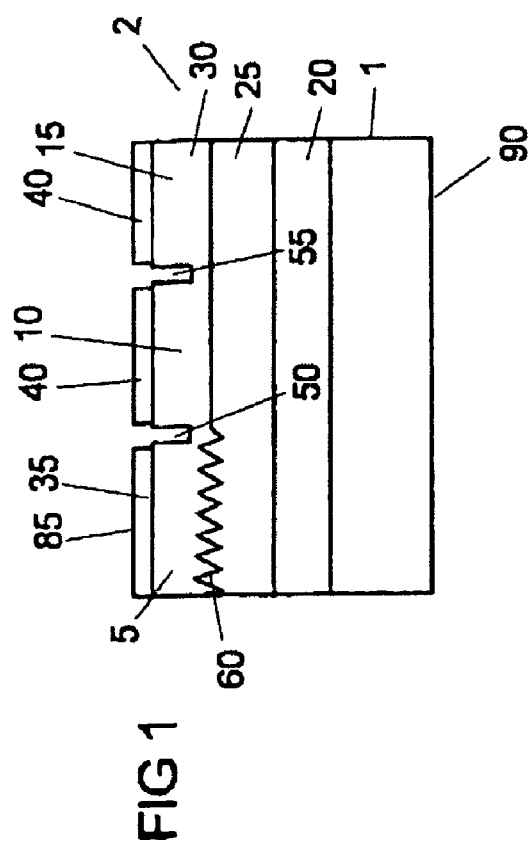
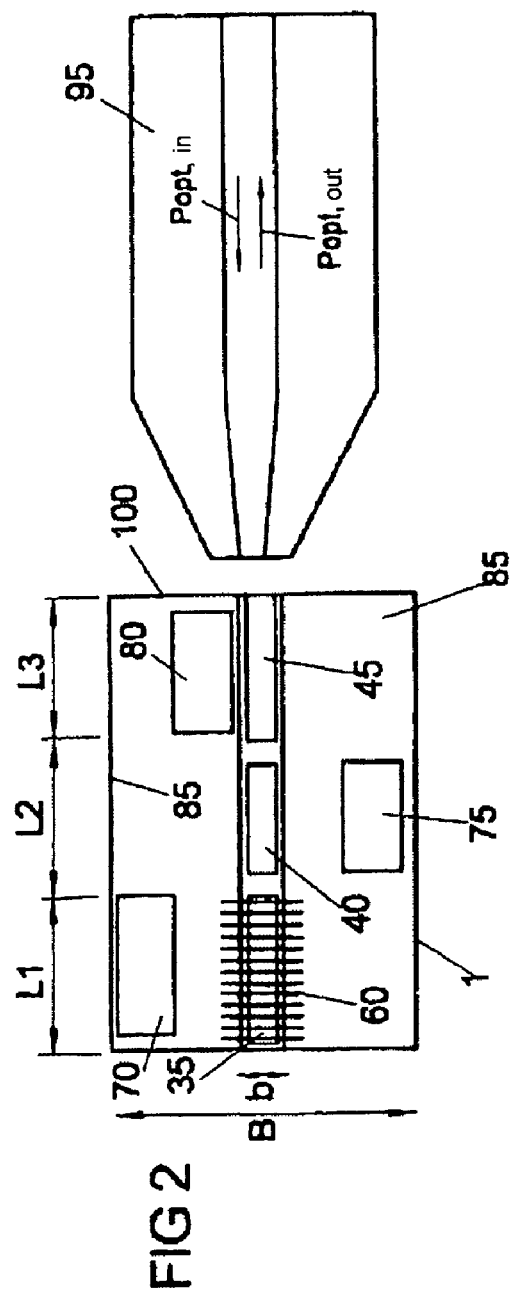

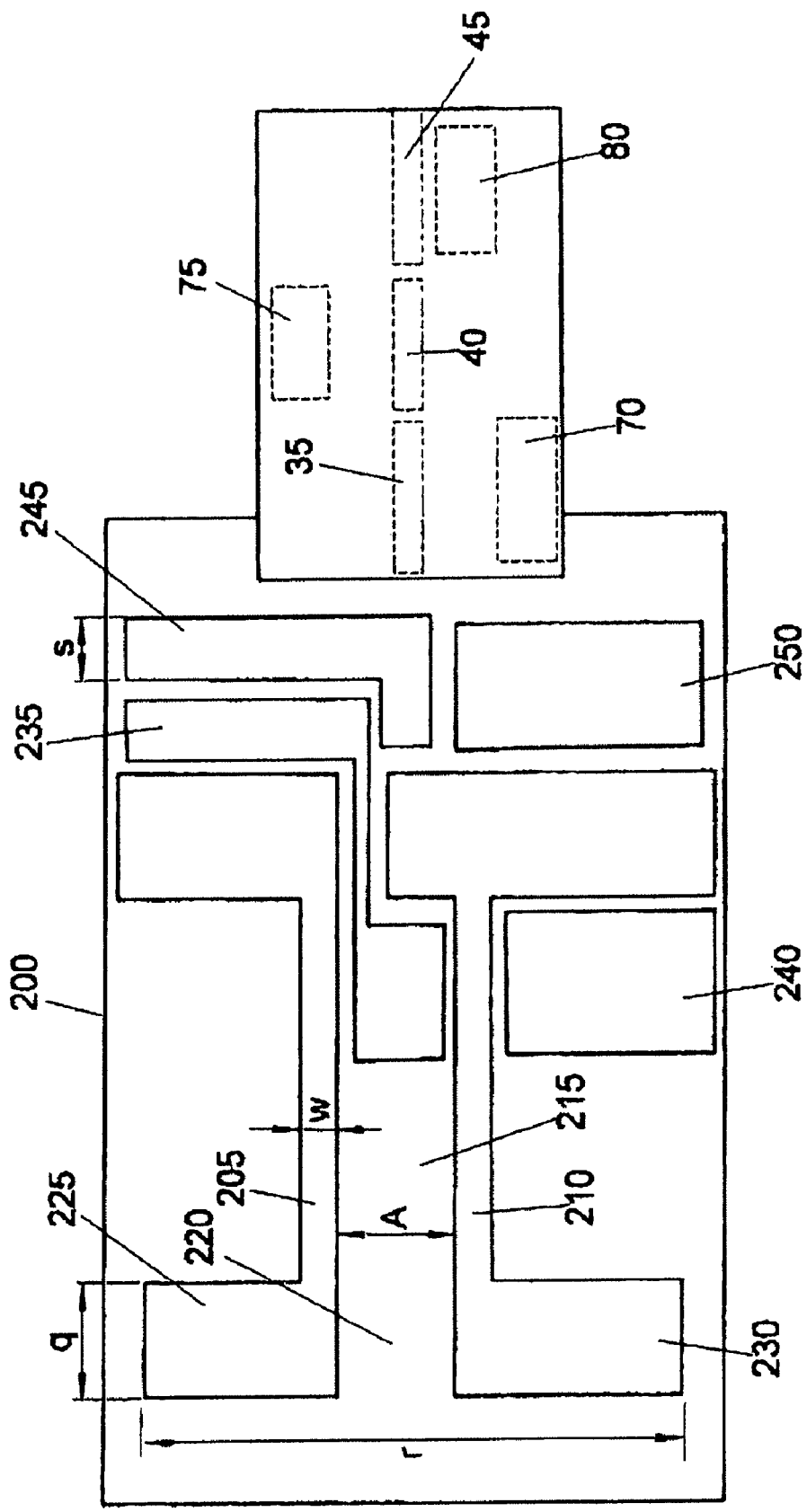

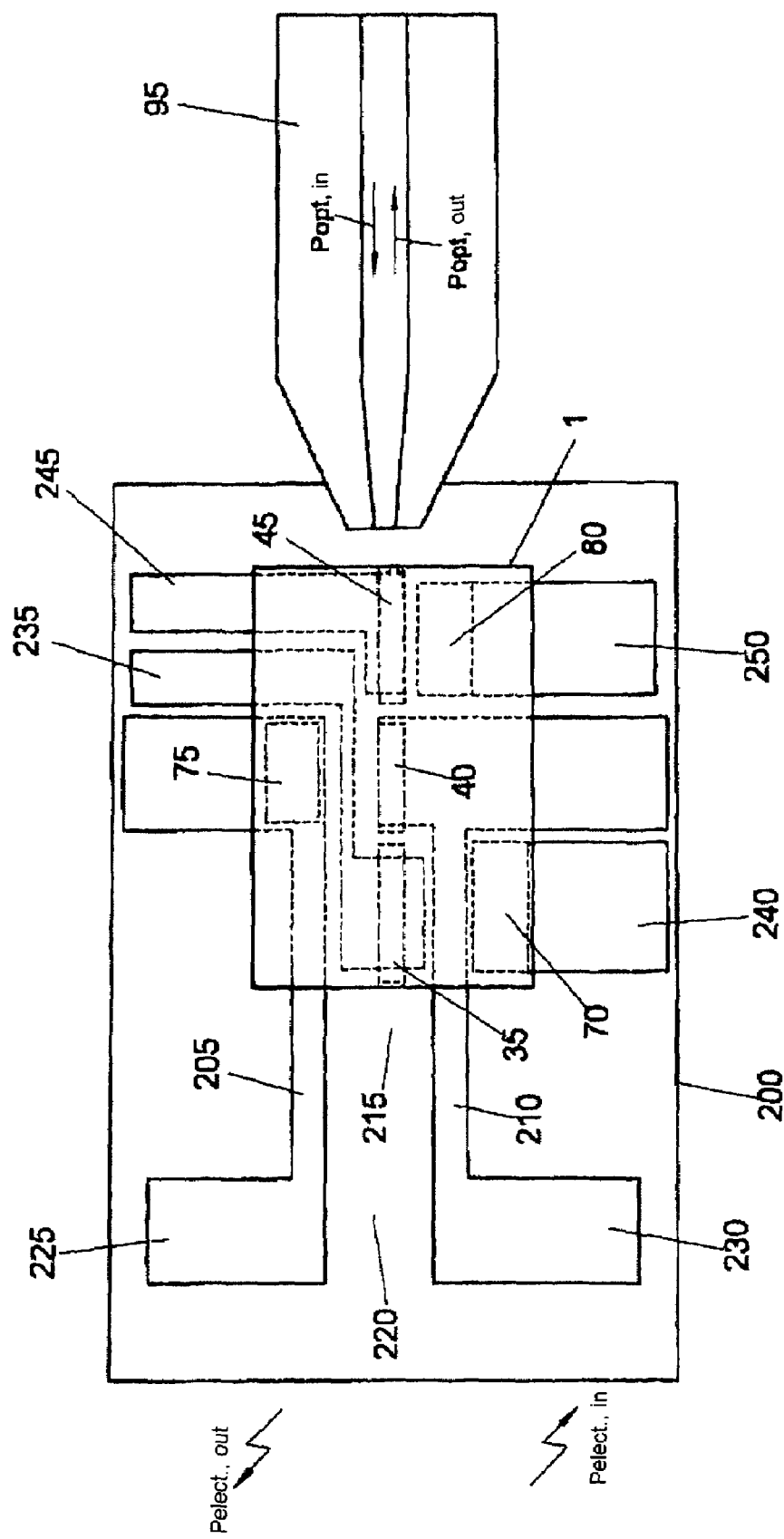

ELECTRO-OPTICAL COMPONENT

REFERENCE TO RELATED APPLICATIONS

This application claims the benefit of the priority date of German application DE 103 03 676.8, filed on Jan. 24, 2003, the contents of which are herein incorporated by reference in their entirety.

FIELD OF THE INVENTION

The invention relates to an electro-optical component and a method of employing such an element to transmit and receive millimeter or submillimeter waves.

BACKGROUND OF THE INVENTION

The term "millimeter waves" is understood hereinafter to mean electromagnetic waves whose wavelength (free space wavelength) lies in the millimeters range; correspondingly, the term "submillimeter waves" is understood to mean electromagnetic waves whose wavelength is less than one millimeter. The term "millimeter antenna" and "submillimeter antenna" is used hereinafter to mean antennas which can radiate and/or receive electromagnetic millimeter waves and submillimeter waves, respectively.

A component of this type is disclosed in the document "Monolithically integrated Yagi-Uda antenna for photonic emitter operating at 120 GHz" (A. Hirata, T. Furuta and T. Nagatsuma; Electronics Letters, 30 Aug. 2001, Vol. 37, No. 18). This previously known component is an arrangement comprising a photodiode and a Yagi-Uda antenna connected to the photodiode. The photodiode, which is designed as a UTC (UTC: uni-travelling-carrier photodiode), receives optical signals modulated with a signal frequency of 120 GHz and converts them into electrical signals. The electrical signals thus have an electrical frequency of likewise 120 GHz and are radiated by the Yagi-Uda antenna connected to the UTC photodiode. In other words, the previously known component is an electro-optical transducer which converts optical signals with a high modulation frequency into electromagnetic millimeter waves.

SUMMARY OF THE INVENTION

The invention is based on the object of specifying an electro-optical component which is particularly well suited to the generation of millimeter waves or submillimeter waves.

One advantage of the electro-optical component according to the invention can be seen in the fact that it has a particularly high efficiency in the conversion of optical signals into electromagnetic millimeter or submillimeter waves, because an electroabsorption modulator is used for detecting the optical signals.

A further advantage of the electro-optical component according to the invention is that it has a double functionality, namely because the electroabsorption modulator can also be operated in the opposite direction and can thus be used for generating modulated optical signals. This is because, in concrete terms, optical light signals with a modulation frequency which have been received by the millimeter or submillimeter antenna connected to the electroabsorption modulator can be applied to the electro-optical component according to the invention.

For the already mentioned "opposite" direction in the operation of the electro-optical component—in other words for generating modulated optical light signals—an optical signal source such as a laser, for example, is employed. Therefore, in the context of one development of the electro-optical component, it is regarded as advantageous if the electro-optical component has or contains an optically active element. This is because, in such a case, a connection of a separate light source, in particular of a laser, to the electro-optical component can be dispensed with since the component then already contains such a light source itself.

It is possible to produce an electro-optical component with an electroabsorption modulator and an optically active element particularly simply and thus cost-effectively if the optically active element and the electroabsorption modulator are integrated in the same semiconductor substrate. This is because production steps can be saved in the case where the two components are integrated in the same semiconductor substrate.

For the generation of modulated optical light signals, it is regarded as advantageous if the optically active element is a laser, in particular a DFB (DFB: distributed feedback laser) or a DBR (DBR: distributed Bragg reflector) laser or an optical amplifier, in particular an SOA (SOA: semiconductor optical amplifier).

The electro-optical component can be formed in a particularly compact and thus space-saving manner if the millimeter or submillimeter antenna is arranged on the semiconductor substrate.

Instead of the millimeter or submillimeter antenna being integrated on the semiconductor substrate, it may alternatively be provided that the millimeter or submillimeter antenna is arranged on a circuit carrier and the semiconductor substrate is fixed on the circuit carrier.

For the targeted optimization of the electroabsorption modulator and of the optically active element, it is regarded as advantageous if the semiconductor substrate has at least two different active layers, of which one active layer is optimized for the optically active element and the further active layer is optimized for the electroabsorption modulator. The order of the layers is insignificant in this case, so that the active layer optimized for the optically active element may be arranged above the further layer optimized for the electroabsorption modulator, or conversely below said further layer.

QD (QD: quantum dot), MQD (MQD: multiple quantum dot), QW (QW: quantum well) and/or MQW (MQW: multiple quantum well) layers are suitable for the optimization of electroabsorption modulators and of optically active elements, so that it is regarded as advantageous if at least one of the two active layers is a QD layer, an MQD layer, a QW layer or an MQW layer.

Slotted antennas, in particular, are highly suitable for receiving and for generating millimeter or submillimeter waves, so that it is regarded as advantageous if a slotted antenna is used as the antenna in the electro-optical component.

The slotted antenna is advantageously a CPW-fed antenna fed by a coplanar electrical waveguide. In this case, the abbreviation CPW stands for "coplanar-waveguide-fed".

The millimeter or submillimeter antenna may, for example, also be a Yagi-Uda antenna or a "log-period" antenna.

Moreover, it is regarded as advantageous if the electromagnetic millimeter or submillimeter waves are focused in the antenna region; therefore, it is regarded as advantageous if a lens, in particular a silicon lens, for "refocusing" the electromagnetic waves is assigned to or arranged upstream of the millimeter or submillimeter antenna. The lens is advantageously hemispherically curved in order to achieve a particularly efficient focusing of the millimeter or submillimeter waves.

Moreover, it is regarded as advantageous if the semiconductor substrate belongs to the III/V material system; in particular, the semiconductor substrate may be, by way of example, an indium phosphite or a gallium arsenide material.

The invention is furthermore based on the object of specifying a method for generating millimeter and/or submillimeter waves which can be carried out particularly simply and efficiently.

With regard to the advantages of the method according to the invention and with regard to the advantages of the advantageous refinements of the method according to the invention, reference is made to the above explanations in connection with the electro-optical component according to the invention, since the advantages essentially correspond to one another.

BRIEF DESCRIPTION OF THE DRAWINGS

In order to elucidate the invention, FIGS. 1 to 4 show an exemplary embodiment of an electro-optical component according to the invention.

FIG. 1 is a cross section diagram illustrating a portion of an electro-optical element including a semiconductor substrate according to one aspect of the present invention;

FIG. 2 is a plan view of the semiconductor substrate of FIG. 1 along with a waveguide coupled thereto according to another aspect of the present invention;

FIG. 3 is a plan view of a printed circuit board upon which various aspects of the invention may be implemented; and FIG. 4 is a plan view of the printed circuit board of FIG. 3 along with a waveguide coupled thereto according to yet another aspect of the present invention.

DETAILED DESCRIPTION OF THE INVENTION

FIG. 1 illustrates a semiconductor substrate 1, which is part of an electro-optical component 2. The semiconductor substrate 1 may be n-doped, for example. A DFB laser 5, an electroabsorption modulator 10 and an optical amplifier 15 are integrated in the semiconductor substrate 1.

The layer sequence of the semiconductor substrate 1 is configured as follows: an active layer 20 optimized specifically for the laser 5 is situated on the semiconductor substrate 1. The active layer 20 may be, by way of example, a QW layer, an MQW layer, a QD layer or an MQD layer.

A further active layer 25 specifically optimized for the electroabsorption modulator 10 is situated on the active layer 20. The order of the two active layers 20 and 25 is arbitrary, moreover; thus, the active layer 20 for the laser 5 may also be arranged above the further active layer 25 instead of below the latter.

Situated on the further layer 25 is a p-doped covering layer 30 provided with electrical contacts 35, 40 and 45 for making contact with the laser 5, the electroabsorption modulator 10 and the amplifier 15.

The covering layer 30 is segmented by trenches 50 and 55, as a result of which the regions for the laser 5, the electroabsorption modulator 10 and the amplifier 15 are demarcated from one another.

The DFB laser 5 has a grating structure 60 formed in the further active layer 25.

FIG. 2 shows the semiconductor substrate 1 in accordance with FIG. 1 in plan view. It reveals the grating structure 60 of the laser 5 and also the contacts 35, 40 and 45 with which the p-doped covering layer 30 is in each case contact-connected. Furthermore, contact regions 70, 75 and 80 can be discerned, in which the p-doped covering layer 30 and also the two active layers 20 and 25 are removed—for example etched away. In said contact regions 70, 75 and 80, the n-doped semiconductor substrate 1, which is otherwise covered by the layers 20, 25 and 30, can be contact-connected from the front side or top side 85 of the semiconductor substrate. The front side 85 and the rear side 90 of the semiconductor substrate are identified by their reference symbols in FIG. 1.

FIG. 2 furthermore illustrates an optical waveguide 95, for example a glass waveguide, which is connected to the semiconductor substrate 1 at the outer side 100 of the semiconductor substrate which faces the amplifier 15.

With this waveguide 95, it is possible to couple optical signals into the semiconductor substrate 1, which are converted into electrical signals by the electroabsorption modulator 10. In the other direction, it is possible to couple optical signals into the waveguide 95 from the semiconductor substrate 1, said signals being generated by the laser 5 and modulated by the electroabsorption modulator 10 in a manner dependent on electrical signals present at the electroabsorption modulator 10.

The light which is generated in the semiconductor substrate 1 and fed into the optical waveguide 95 is symbolized by an arrow bearing the reference symbol $P_{opt,out}$ in FIG. 2; the light which is fed into the semiconductor substrate 1 is identified by an arrow bearing the reference symbol $P_{opt,in}$.

The laser 5 preferably has a length L1 of between 50 μm and 500 μm. The electroabsorption modulator 10 preferably has a length of 50 μm to 300 μm; the length L3 of the electroabsorption modulator 10 is identified by the reference symbol L2 in FIG. 2. The length L3 of the amplifier 15 is preferably 50 μm to 350 μm. The width b of the laser 5, of the electroabsorption modulator 10 and of the amplifier 15 is preferably 1 μm to 3 μm. The total width B of the semiconductor substrate 1 should preferably lie between 200 μm and 500 μm.

The wavelength λ1 of the light $P_{opt,in}$ radiated into the semiconductor substrate 1 may be identical to the wavelength λ2 of the light $P_{opt,out}$ generated by the laser 5; different wavelengths λ1 and λ2 are also possible instead.

FIG. 3 reveals a lead frame 200, for example a printed circuit board on which two coplanar electrical conductors 205 and 210 form an electrical coplanar conductor 215, that is to say an electrical waveguide suitable for millimeter or submillimeter waves.

The two conductors 205 and 210 have a waveguide width w of approximately 10 μm to 50 μm and a distance A of between 20 μm and 80 μm The two conductors 205 and 210 are connected by one of their line ends in each case to an antenna 220, which is formed from metal pads 225 and 230. The metal pads 225 and 230 have a width q of approximately 100 μm and a total length r (including distance A) of 500 μm to 2 mm.

The two conductors 205 and 210 are connected by their other line end to the contact 40 and the contact region 75 of the electroabsorption modulator 10, as is explained further below in connection with FIG. 4. The electrical coplanar conductor 215 thus connects the antenna 220 and the electroabsorption modulator 10 to one another and is specifically dimensioned and designed for this in such a way that it is specifically suitable for the transmission of electrical millimeter and/or submillimeter waves and adapted in particular with regard to its characteristic impedance.

FIG. 3 furthermore reveals connecting lines 235, 240, 245 and 250, which serve for making contact with the laser 5 and the amplifier 15. The way in which the electrical connecting lines 235, 240, 245 (width s=10 μm–50 μm) and 250 are connected in concrete terms is explained in connection with FIG. 4.

The semiconductor substrate 1 in accordance with FIG. 2 is additionally shown "rotated" in FIG. 3—that is to say in a "phantom view" from below of the rear side 90 of the semiconductor substrate. This illustration is intended to indicate that the semiconductor substrate 1 is placed onto the lead frame 200 upside down and then soldered on. For the sake of clarity, only the contacts and the contact regions are shown in this illustration.

FIG. 4 shows the lead frame 200 and the semiconductor substrate 1 after the mounting thereof; the lead frame 200 and the semiconductor substrate 1 thus form the electro-optical component 2.

It can be seen in FIG. 4 that the contact region 70 for making contact with the "n-contact" of the laser 5 is connected to the connecting line 240. The "p-contact" of the laser 5 is electrically driven via the contact 35 and thus via the connecting line 235.

The optical amplifier 15 is connected to the connecting line 245 via its p-contact 45; the connecting line 250 is connected to the contact region 80 for making contact with the n-contact of the optical amplifier 15.

The p-contact 40 of the electroabsorption modulator 10 is connected to the conductor 210 of the electrical coplanar conductor 215; the conductor 205 of the electrical coplanar conductor 215 is connected to the contact region 75 for making contact with the n-contact of the electroabsorption modulator 10.

The electrical component 2 in accordance with FIGS. 1 to 4 can be operated bi-directionally: on the one hand, with the electro-optical component 2, it is possible to convert optical light signals $P_{opt,in}$ into electrical waves $P_{electr.,out}$ in the millimeter and/or submillimeter range. On the other hand, it is possible—thus in the opposite direction—to generate a corresponding optical output signal $P_{opt,out}$ from electrical waves $P_{electr.,in}$ in the millimeter and/or submillimeter range. This will now be explained briefly:

An optical input light signal $P_{opt,in}$ is absorbed by the electroabsorption modulator 10, as a result of which electron-hole pairs are generated, which bring about an electrical voltage at the connections 75 and 40 of the electroabsorption modulator 10. In the case of a light signal $P_{opt,in}$ modulated with a frequency of 100 GHz, for example, an electrical AC voltage thus forms at the connections 40 and 75 of the electroabsorption modulator 10, which voltage is likewise at 100 GHz and is transmitted via the electrical coplanar conductor 215 to the antenna 220 and radiated by the latter as millimeter or, in the case of higher data rates and thus higher frequencies, as submillimeter waves $P_{electr,out}$.

In the opposite direction, the electro-optical component functions as follows: an electrical millimeter wave or submillimeter wave $P_{electr,in}$ is received by the antenna 220, whereupon a corresponding electrical signal or a corresponding electrical wave passes via the electrical coplanar conductor 215 to the electroabsorption modulator 10; this electrical signal drives the electroabsorption modulator 10 in such a way that the latter modulates its absorption behavior in accordance with the electrical signal. This then has the effect that the light generated by the laser 5 is modulated and modulated optical signals $P_{opt,out}$ are generated, which are coupled into the optical waveguide 95 from the semiconductor substrate 1. Although the invention has been illustrated and described with respect to one or more implementations, alterations and/or modifications may be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

List of Reference Symbols
1 Semiconductor substrate
2 Electro-optical component
5 DFB laser
10 Electroabsorption modulator
15 Optical amplifier
20 Active layer
25 Further active layer
30 p-doped covering layer
35, 40, 45 Electrical contacts
50, 55 Trenches
60 Grating structure
70, 75, 80 Contact regions
85 Front side
90 Rear side
95 Optical waveguide
100 Optical connection side
200 Lead frame
205, 210 Conductors
220 Antenna
230 Metal pads
240, 245, 250 Connecting line

What is claimed is:
1. An electro-optical system, comprising:
a semiconductor substrate;
a first active layer overlying the semiconductor substrate;
a second active layer overlying the first active layer;
a covering layer overlying the second active layer; and
an electroabsorption modulator portion associated with the substrate and layers in a central portion thereof, disposed between a laser portion and an optical amplifier portion, respectively,
wherein the system comprises electrical contacts coupled to the electroabsorption modulator portion, laser portion, and optical amplifier portion, respectively; and
wherein the system comprises an electrical waveguide electrically coupled to the electroabsorption modulator contacts, and operable to provide electrical signals thereto for modulation of optical signals from the laser portion.

2. The system of claim 1, further comprising a grating in the laser portion at an interface of the second active layer and the covering layer.

3. The system of claim 1, further comprising an optical waveguide operably coupled to the optical amplifier portion, wherein optical signals generated by the laser portion are modulated by the electroabsorption modulator based on electrical signals applied thereto, and wherein the modulated optical signals are passed to the waveguide through the optical amplifier portion.

4. The system of claim 1, wherein the electrical waveguide further comprises a millimeter or submillimeter antenna operable to convert millimeter or submillimeter waves into electrical signals or vice-versa.

5. The system of claim 1, wherein optical signals from the optical waveguide are converted to electrical signals to the electrical waveguide through the electroabsorption modulator portion.

6. The system of claim 1, wherein the semiconductor substrate is oriented upside down with respect to the electrical waveguide, and is electrically coupled to the electrical waveguide through the laser portion contacts, the electroabsorption modulator contacts, and the optical amplifier contacts, respectively, in a flip-chip type arrangement.

7. The system of claim 1, wherein one of the first and second active layer is optimized for the laser portion, and the other of the first and second active layer is optimized for the electroabsorption modulator portion.

* * * * *